US011913465B2

(12) United States Patent
Dam

(10) Patent No.: US 11,913,465 B2
(45) Date of Patent: Feb. 27, 2024

(54) NUCLEAR COOLANT PUMP SEAL AND METHODS OF SEALING

(71) Applicant: CANDU ENERGY INC., Mississauga (CA)

(72) Inventor: Richard Dam, Mississauga (CA)

(73) Assignee: CANDU ENERGY INC., Ontario (CA)

( * ) Notice: Subject to any disclaimer, the term of this patent is extended or adjusted under 35 U.S.C. 154(b) by 352 days.

(21) Appl. No.: 16/971,874

(22) PCT Filed: Feb. 21, 2019

(86) PCT No.: PCT/CA2019/050214
§ 371 (c)(1),
(2) Date: Aug. 21, 2020

(87) PCT Pub. No.: WO2019/161500
PCT Pub. Date: Aug. 29, 2019

(65) Prior Publication Data
US 2020/0392965 A1  Dec. 17, 2020

Related U.S. Application Data

(60) Provisional application No. 62/633,578, filed on Feb. 21, 2018.

(51) Int. Cl.
*F04D 29/12* (2006.01)
*F04D 3/00* (2006.01)
(Continued)

(52) U.S. Cl.
CPC ............ *F04D 29/086* (2013.01); *F04D 3/00* (2013.01); *F16J 15/34* (2013.01); *F16J 15/3408* (2013.01);
(Continued)

(58) Field of Classification Search
CPC .......... F04D 29/086; F04D 29/12; F04D 3/00; F04D 29/083; F04D 29/102;
(Continued)

(56) References Cited

U.S. PATENT DOCUMENTS 4,095,806 A * 6/1978 Dempsey ............. F16J 15/3464
277/361
4,272,084 A * 6/1981 Martinson ............ F16J 15/3464
277/408
(Continued)

FOREIGN PATENT DOCUMENTS

| CA | 2991118 A1 | 12/2017 |
|---|---|---|
| CN | 103821757 A | 5/2014 |

(Continued)

OTHER PUBLICATIONS

Supplemental European Search Report issued in European Application No. 19758251, dated Nov. 8, 2021.
(Continued)

*Primary Examiner* — Courtney D Heinle
*Assistant Examiner* — Andrew J Marien
(74) *Attorney, Agent, or Firm* — NORTON ROSE FULBRIGHT CANADA LLP

(57) ABSTRACT

A seal assembly for a pump comprises a gland housing mounted to the pump casing. A staging flow pathway is defined within the gland housing with multiple seal chambers. A seal stage is positioned in each seal chamber, each having a static sealing element and a rotating sealing element, the sealing elements engaging one another to form a fluid-tight seal. A rotor assembly pumps coolant through the gland housing. Fluid passing through the staging flow pathway is accelerated by an acceleration surface of the rotor assembly. An inlet passage feeds coolant fluid into the staging flow pathway and past the acceleration surface.

18 Claims, 6 Drawing Sheets

(51) Int. Cl.
*F04D 29/08* (2006.01)
*F16J 15/34* (2006.01)
*G21C 15/04* (2006.01)
*G21C 15/243* (2006.01)
*F04D 29/16* (2006.01)

(52) U.S. Cl.
CPC .......... *F16J 15/3428* (2013.01); *G21C 15/04* (2013.01); *G21C 15/243* (2013.01); *F04D 29/12* (2013.01); *F04D 29/16* (2013.01)

(58) Field of Classification Search
CPC .... F04D 29/104; F04D 29/106; F04D 29/108; F04D 29/122; F04D 29/124; F04D 29/126; F04D 29/128; G21C 15/243; G21D 1/04; F16J 15/34; F16J 15/3408; F16J 15/3428
See application file for complete search history.

(56) References Cited

U.S. PATENT DOCUMENTS

| | | | |
|---|---|---|---|
| 5,171,024 A | 12/1992 | Janocko | |
| 5,217,233 A * | 6/1993 | Pecht | F16J 15/3412 277/306 |
| 6,959,929 B2 * | 11/2005 | Pugnet | F04D 29/122 277/408 |
| 2007/0280823 A1 * | 12/2007 | Kanemori | F04D 29/162 415/170.1 |
| 2011/0073280 A1 * | 3/2011 | Liu | F04D 25/062 165/95 |
| 2013/0075975 A1 * | 3/2013 | Hilaris | F04C 15/0003 277/350 |
| 2013/0322794 A1 * | 12/2013 | Meuter | F04D 29/12 384/132 |
| 2021/0332826 A1 * | 10/2021 | Kinoshita | F04D 29/12 |

FOREIGN PATENT DOCUMENTS

| | | |
|---|---|---|
| CN | 105673551 B | 6/2016 |
| DE | 2614884 A1 | 1/1977 |
| EP | 0439308 B1 | 5/1997 |
| ES | 2074510 T3 | 9/1995 |
| JP | 2012-241724 A | 12/2012 |
| JP | 2012241724 A | 12/2012 |

OTHER PUBLICATIONS

International Search Report and Written Opinion issued in International Application No. PCT/CA2019/050214 dated Jun. 7, 2019.
A Substantive Office Action issued by the Argentine Patent Office on the corresponding Argentine Patent Application Serial No. 20190100447.
An Office Action received for the corresponding Japanese Patent Application No. 2020-544423, issued by the Japan Intellectual Property Office, dated Feb. 8, 2023.
An Office Action received for the corresponding Korean Patent Application No. 10-2020-7026488, issued by the Korean Intellectual Property Office, dated Aug. 23, 2023.
A communication received from the corresponding EP Application No. 19758251.3, issued by the European Patent Office, dated Mar. 13, 2023.
An Office Action received from the corresponding CA Patent Application No. 3,091,968, issued by the Canadian Intellectual Property Office, dated May 31, 2023.

* cited by examiner

NUCLEAR COOLANT PUMP SEAL AND METHODS OF SEALING

CROSS-REFERENCE TO RELATED APPLICATIONS

This application claims all benefit including priority to U.S. Provisional Patent Application 62/633,578, filed Feb. 21, 2018, and entitled "NUCLEAR COOLANT PUMP SEAL AND METHODS OF SEALING"; the contents of which are hereby incorporated by reference in its entirety.

FIELD

This relates to nuclear power generation, and particularly to coolant pumps for nuclear power generation facilities.

BACKGROUND

In nuclear power generation facilities, fluid coolant, e.g., water, is circulated using pumps for control of reactor temperature and reaction rate. Pump sealing is of significant importance for performance. Moreover, effective sealing may be important for regulatory compliance, for example, to prevent leakage of radioactive material.

Within rotating machinery such as pumps, seals may be installed between stationary and rotating components. In such situations, the pressure differential that can be maintained across a seal may be proportional to the pressure with which the sealing elements are urged together. However, increased sealing pressure may lead to increased wear of sealing elements.

The effective pressure drop across a seal may depend on fluid conditions proximate the seal, such as pressure and fluid velocity. Accordingly, balancing of seal effectiveness and longevity may likewise depend on fluid conditions.

SUMMARY

A coolant pump for a nuclear power generation facility comprises: a casing assembly having a gland housing; a seal assembly having a staging flow pathway defining first and second seal chambers; a rotor assembly pumping a coolant fluid through the gland housing, the rotor assembly having an acceleration surface, wherein fluid passing through the staging flow pathway is accelerated by the acceleration surface; first and second seal stages within the first and second seal chambers, each having a static sealing element and a rotating sealing element, the sealing elements engaging one another to form a fluid-tight seal; an inlet passage for feeding the coolant fluid into the staging flow pathway and past the acceleration surface.

An example method of sealing a pump in a nuclear power generation facility comprises: directing pressurized fluid through a first section of a staging flow path towards a first seal; increasing angular velocity of the pressurized fluid as it traverses the staging flow path by motion of a rotor assembly of the pump; directing the pressurized fluid through a second section of the staging flow path towards a second seal.

A seal assembly for a pump comprises: a gland housing for mounting to the pump casing; a staging flow pathway within the gland housing defining first and second seal chambers; a rotor assembly pumping a coolant fluid through the gland housing, the rotor assembly having an acceleration surface, wherein fluid passing through the staging flow pathway is accelerated by the acceleration surface; first and second seal stages within the first and second seal chambers, each having a static sealing element and a rotating sealing element, the sealing elements engaging one another to form a fluid-tight seal; an inlet passage for feeding the coolant fluid into the staging flow pathway and past the acceleration surface.

DETAILED DESCRIPTION

Figure 1:
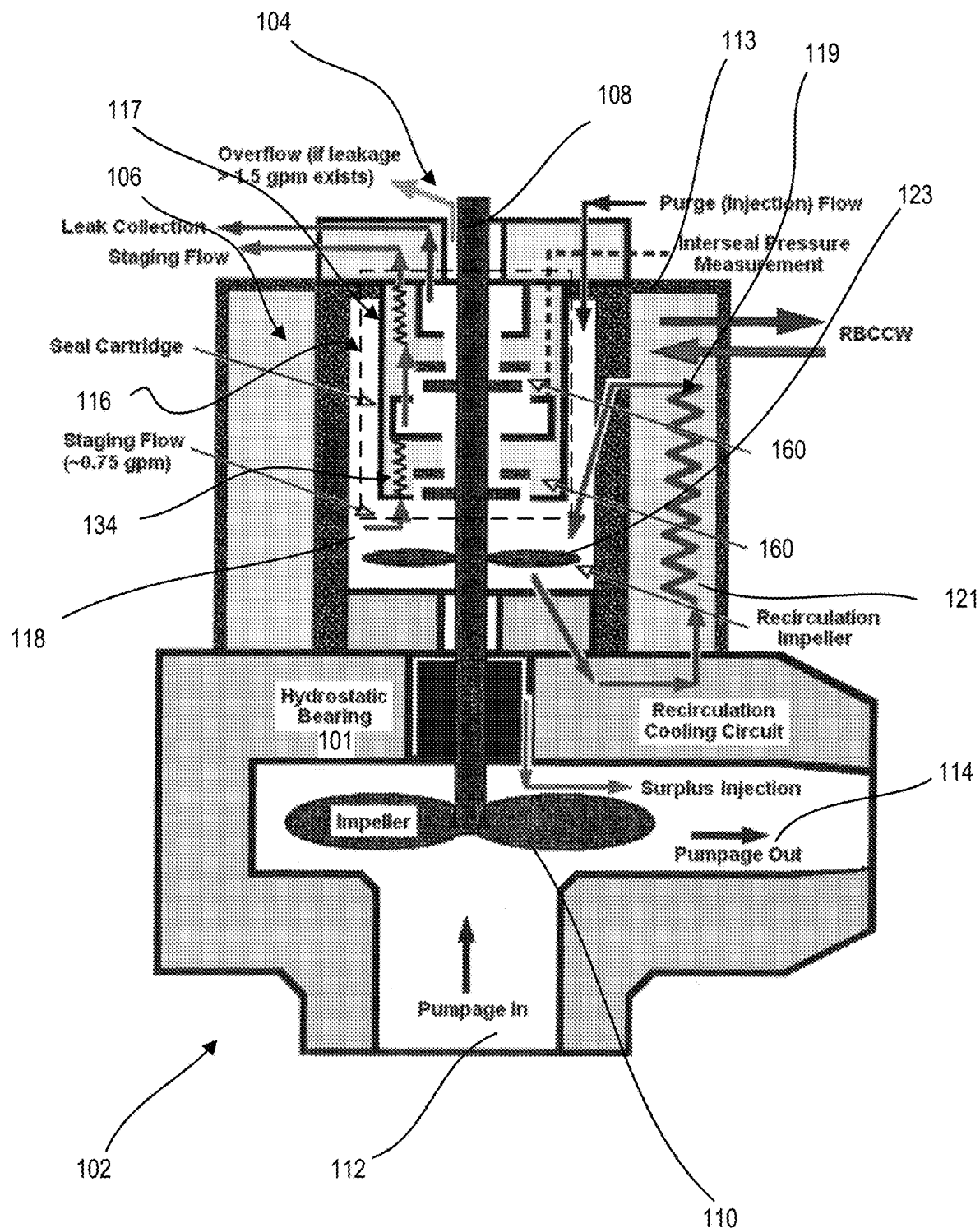
FIG. 1 is a schematic view of a coolant pump.

FIG. 1 depicts a coolant pump 100 for use in a nuclear power generation facility. Coolant pump 100 has a casing 102.

Pump 100 includes a pump rotating assembly including a drive shaft 108 coupled to a pump impeller 110 (e.g. an impeller) for circulation of a working fluid. Drive shaft 108 is mounted to casing 102 with a hydrostatic bearing 101. The working fluid may be a reactor coolant, such as water. Pump impeller 110 draws the working fluid into pump 100 through an inlet 112 and forces the working fluid out of the pump under pressure through an outlet 114.

A gland 113 is installed atop casing 102 around hydrostatic bearing 101 and receives shaft 108. Gland 113 contains a sealing assembly 116 for resisting leakage of fluid from pump 100. Sealing assembly 116 provides a seal between rotating components mounted to drive shaft 108, referred to as a pump rotating assembly 104, and stationary components mounted to or forming part of gland 113, referred to as a stator assembly 106. Gland 113 defines an internal fluid chamber 118. Fluid chamber 118 holds fluid under high pressure, which holds working fluid in the main impeller casing of pump 100.

Fluid circulates through fluid chamber 118 in a staging circuit 117 and in a recirculation loop 119. Staging circuit 117 directs working fluid through a series of chambers for staged sealing. Recirculation loop 119 provides flow of working fluid between internal fluid chamber 118 and a cooling reservoir 121. Circulation through cooling reservoir 121 provides a supply of cool working fluid for circulation through staging circuit 117, so that flow through staging circuit 117 cools components of sealing assembly 116. Flow through recirculation loop 119 may be driven by an auxiliary rotor 123. Auxiliary rotor also creates flow of pressurized fluid within fluid chamber 118 toward hydrostatic bearing 101 to ensure that fluid passing through hydrostatic bearing 101 flows from chamber 118 into the main impeller casing of pump 100.

Working fluid may be admitted to staging circuit 117 under pressure from chamber 118 and routed past components of sealing assembly 116 to step down the pressure in one or more sealing stages. Flow through staging circuit 117 may also cool and lubricate the sealing interfaces and other components. In particular, each seal stage may include an interface between a rotating sealing element and a stationary sealing element, which may be urged together for a tight seal. Relative motion of such sealing components while being urged together may lead to wear on the sealing components and buildup of heat due to friction.

The forces acting on a seal may be represented as the balance ratio, namely, a ratio of forces tending to close the seal and forces tending to open the seal. The balance ratio of a seal may correlate to the seal's propensity to leak or fail—higher balance ratios correspond to tighter (more leak-resistant) seals, and lower balance ratios correspond to looser (less leak-resistant) seals.

Urging sealing elements together tends to increase the resistance of the seal to leakage. However, it also tends to increase the wear rate of the seal and the heat produced as sealing elements move relative to one another. Typically, seals are designed to target a particular balance ratio in order to achieve a compromise between leak resistance and longevity. The balance ratio selected for a particular seal application may depend on the pressure differential which will be created across the seal and the required service life of the seal.

The balance ratio of a seal may be influenced, among other factors, by the seal geometry, such as the inner and outer diameters of the stator ring, fluid pressures on the high-pressure and low-pressure sides of the seal, as well as any mechanical force applied to urge the seal elements together.

Figure 2A:
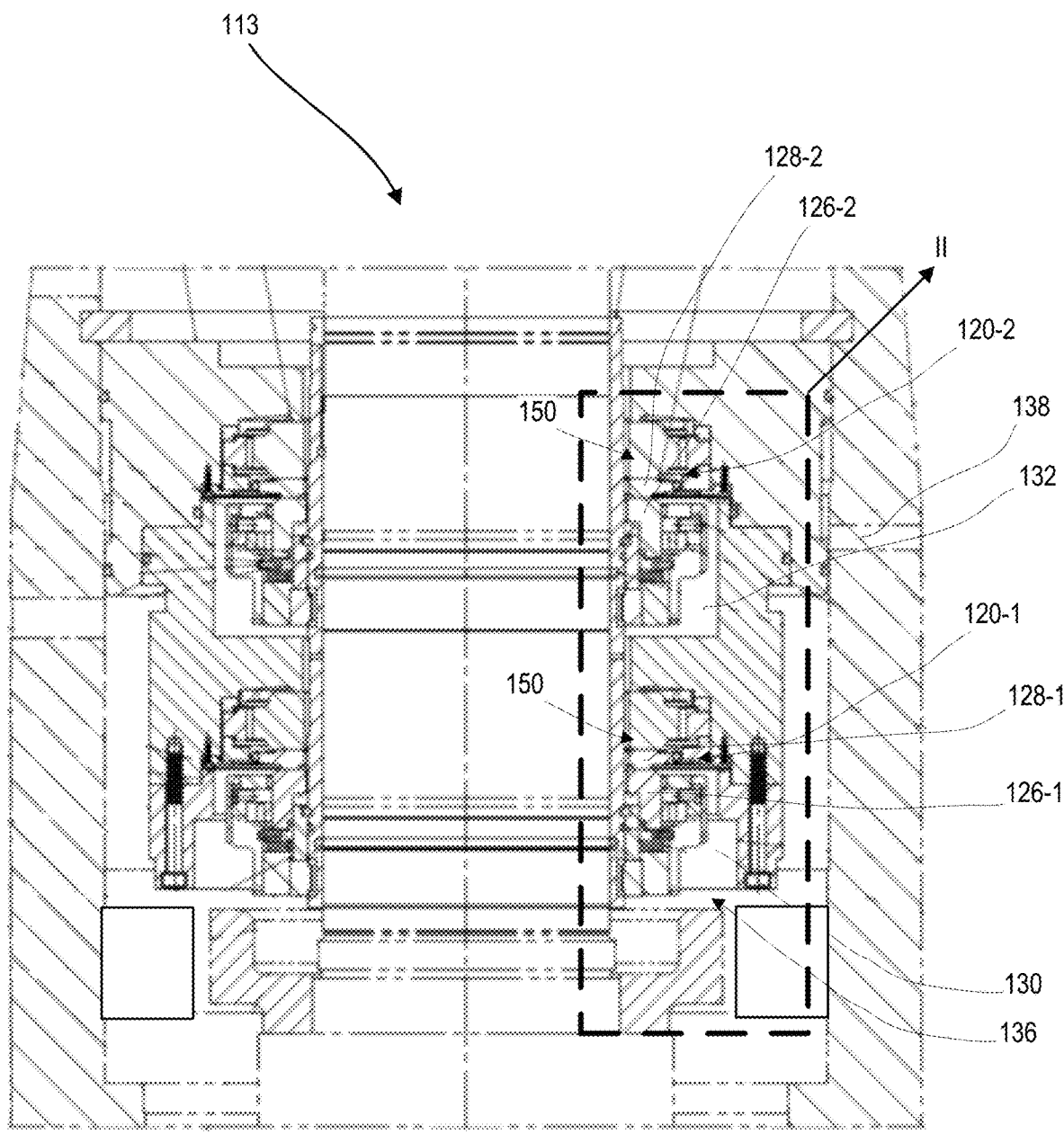
FIG. 2A is a cross-sectional view of the pump of FIG. 1.
Figure 2B:
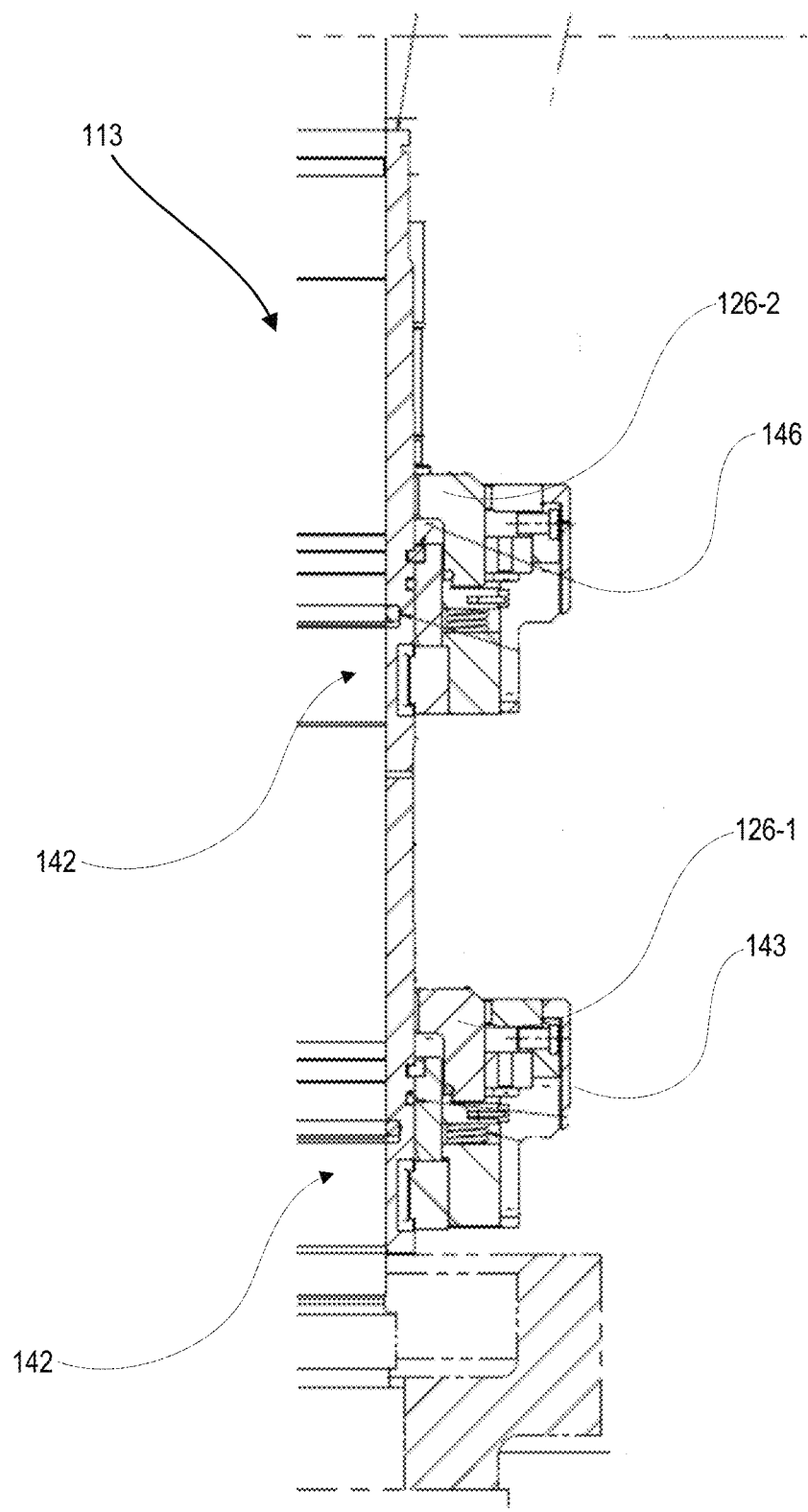
FIG. 2B is a partial enlarged view of region II of FIG. 1, showing a rotor sub-assembly.
Figure 2C:
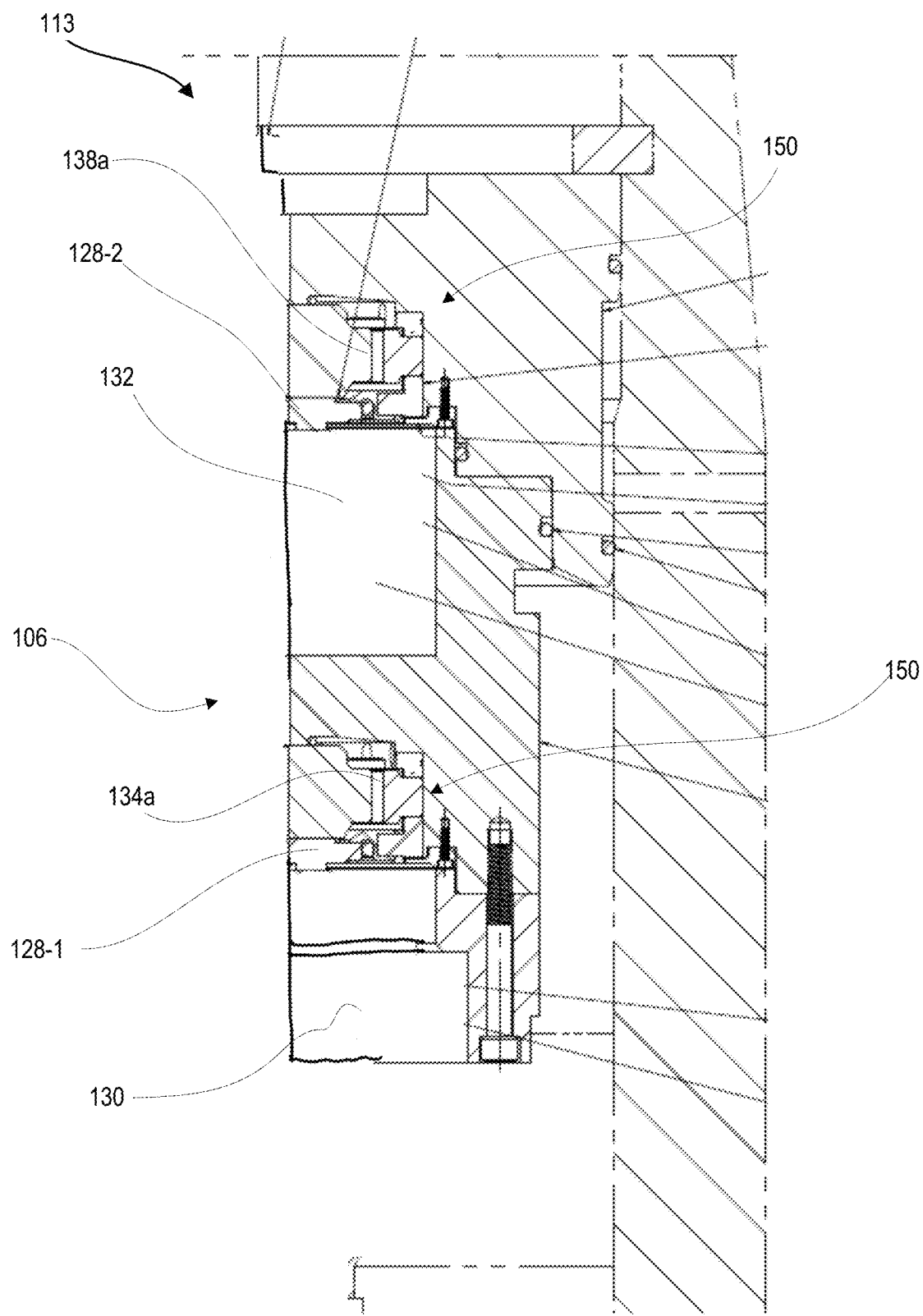
FIG. 2C is a partial enlarged view of region II of FIG. 1, showing a stator sub-assembly.

FIGS. 2A, 2B and 2C depict sealing assembly 116 in greater detail. FIG. 2A is a cross-sectional view of the complete sealing assembly 116. FIG. 2B is an enlarged view of region II of FIG. 2A, showing components of pump rotating assembly 104 that are mounted for rotation with drive shaft 208. FIG. 2C is an enlarged view of region II of FIG. 2A, showing components of stator assembly 106 that are stationary and mounted to gland 113.

In the depicted embodiment, sealing assembly 116 has two sealing stages 120, referred to individually as sealing stages 120-1 and 120-2. Sealing stages 120-1, 120-2 form first and second sealing stages. Sealing stages 120-1, 120-2 have respective rotor seal members 126-1, 126-2 (collectively, rotor seal members 126). Sealing stages 120-1, 120-2 have respective stator seal members 128-1, 128-2 (collectively, seal members 128).

Figure 3:
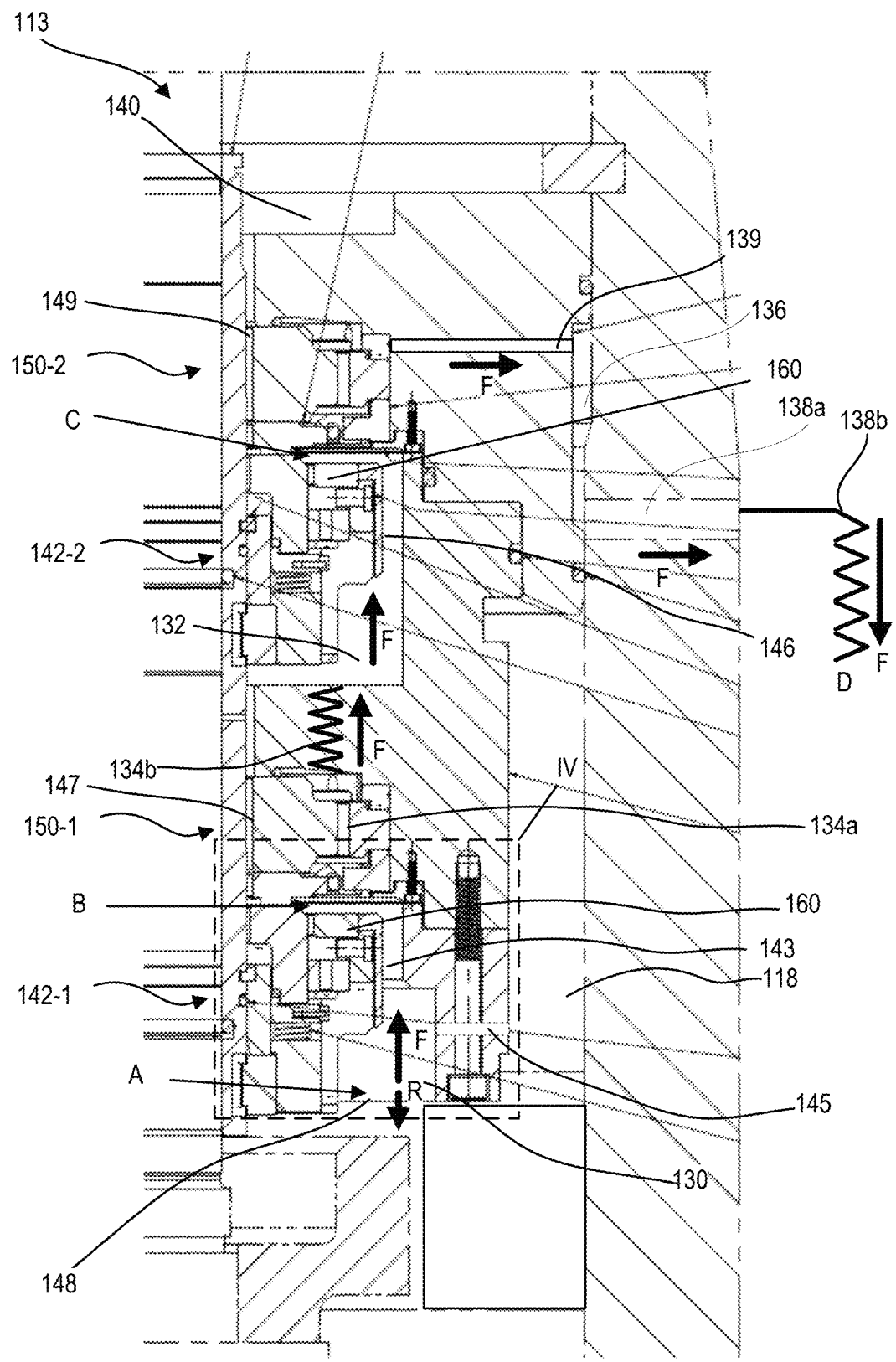
FIG. 3 is an enlarged view of region II of FIG. 1, showing a flow path of water through the coolant pump.

As best shown in FIGS. 2A and 3, rotating assemblies 142 are received within primary staging chamber 130 and secondary staging chamber 132, which form part of staging flow circuit 117.

Stator seal members 128 are mounted within block structures 150, which are mounted within chamber 118 and hold stator seal members 128 securely in a fixed position. Block structures 150 define a plurality of inner staging chambers. As depicted, block structures 150 define two staging chambers, namely primary staging chamber 130 and secondary staging chamber 132. Each staging chamber corresponds to a seal stage of sealing assembly 116. In other embodiments, more or fewer than two staging chambers may be defined, e.g. one chamber to each seal stage 120.

In the depicted embodiment, the rotating assemblies 142 of seal stages 120-1, 120-2 are identical. Such a design may allow rotating assemblies 142 to be interchangeable, limiting the number of unique parts and assemblies in pump 100.

FIG. 3 is a simplified schematic diagram of seal stages 120-1, 120-2 of seal assembly 116, showing staging flow of cooling fluid.

Primary staging chamber 130 and secondary staging chamber 132 are in communication by way of staging flow passage 134 which comprises staging flow passages 134a, 134b shown in FIG. 3. Staging flow passage 134 receives flow from primary staging chamber 130 and includes a convoluted flow conduit, e.g. a coil. The convoluted flow path cooperate to restrict flow through passage 134, such that cooling fluid traverses the passage at a defined rate and with a specific pressure drop. In some embodiments, the convoluted flow path may have an orifice sized to impose a pressure drop.

Secondary staging chamber 132 receives flow from staging flow passage 134 and discharges staging flow through a discharge passage 138 which comprises discharge passages 138a, 138b shown in FIG. 3. As depicted, discharge passage 138 extends through stator block 150. Flow exiting through discharge passage 138 is subjected to a further restriction and pressure drop to approximately atmospheric pressure. Discharge passage 138 may be configured to impose flow restrictions similar to those of passage 134. For example, discharge passage 138 may include a conduit with convolutions to impose flow restrictions or may have an orifice with small cross-sectional area restricting flow at the inlet or at another location. Alternatively, such flow restriction may be imposed externally to discharge passage 138. Additional staging and cooling flow may pass through a collection duct 139, which may communicate with discharge passage 138 by way of a plenum 136.

Hydraulic chambers 147, 149 are defined behind seal stages 120-1, 120-2, respectively. Each seal stage 120 is designed to permit passage of a small quantity of fluid into the respective hydraulic chamber. That is, seal stage 120-1 permits slight leakage of fluid into hydraulic chamber 147 and seal stage 120-2 permits slight leakage of fluid into hydraulic chamber 149. Hydraulic chamber 147 drains into secondary staging chamber 132. Hydraulic chamber 149 drains to outlet 140.

Hydraulic chambers 147, 149 are the low-pressure sides of seal stages 120-1, 120-2. The pressure differential across seal stage 120-1 is approximately equal to the pressure drop that occurs through staging flow passage 134a, 134b. The pressure differential across seal stage 120-2 is approximately equal to the pressure drop between the entry to discharge passage 138a, 138b and the pressure at outlet 140 (e.g. atmospheric pressure).

Staging flow circuit 117 defines a flow path from chamber 118 into primary staging chamber 130, then through staging flow passage 134, into secondary staging chamber 132 and to through outlet passage 138 and ultimately through discharge outlet 140. The flow path of staging flow circuit 117 extends generally axially, that is, in a direction parallel to the axis of the drive shaft of pump 100.

Fluid within chamber 118 is pressurized at a high pressure, typically in excess of the discharge pressure of pump 100. Fluid discharged to outlet 138 is at a lower pressure, which may be approximately atmospheric pressure. In an example, the pressure drop through staging flow path 117 is approximately 1000 psi. In other embodiments, the pressure drop may be larger, e.g. 1500 psi, or smaller, e.g. 200 psi.

Seal stages 120-1, 120-2 and staging flow circuit 117 are configured to divide the pressure drop. In other words, multiple stages 120 may be configured such that each stage bears only a portion of the total pressure drop across assembly 116. A first pressure drop occurs across seal stage 120-1 and through staging flow passage 134, and a second pressure drop occurs across seal stage 120-2 and through discharge passage 138a, 138b. Total stagnation pressure of fluid at the inlet to primary staging chamber 130 is approximately the same as the total stagnation pressure at the sealing interface of seal stage 120-1 (point B in FIG. 3). The total stagnation pressure at the inlet to primary staging chamber 130 is higher than that at the inlet of secondary staging chamber 132 by approximately the pressure drop through staging flow passage 134. Atmospheric pressure, for example, at point D in FIG. 3 is lower than that at the sealing interface of seal stage 120-2 (point C in FIG. 3) by approximately the pressure drop through discharge passage 138a, 138b. As depicted, staging flow passage 134 and outlet passage 140 impose about the same pressure drop, i.e. about 500 psi. As used herein, the term "stagnation pressure" refers to the sum of the static pressure and the dynamic pressure of a fluid flow, namely, the pressure that would result from decelerating the fluid flow to stagnation without losses.

While the example embodiments described herein illustrate two stages 120-1, 120-2, in other embodiments, three or more stages are included. The third and/or additional stages are positioned in series with the first two stages in the flow pathway. In some embodiments, the components in and interfacing with the third section or stage of the flow path can be configured such that each stage bears a desired portion of the total pressure drop across the assembly. These components and interfaces can include chamber geometry, staging flow values, sealing element configurations, surface features, flow path lengths, etc. and/or any other feature described herein with respect to the two stage design.

References to an assembly with first and second stages can, in some embodiments, refer to assemblies with more than two stages.

Figure 4:
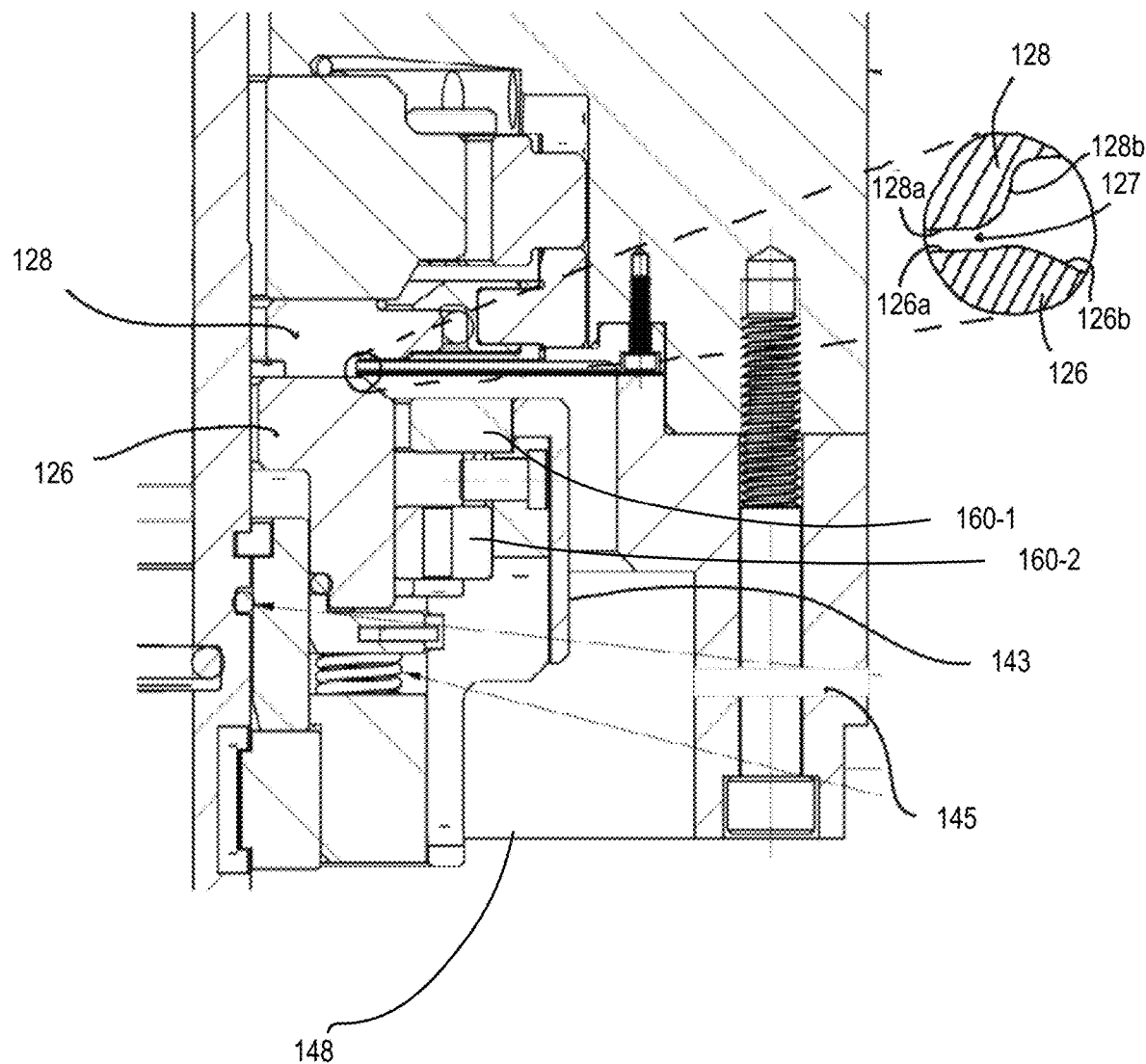
FIG. 4 is an enlarged view of region IV of FIG. 3, showing details of a seal stage.

FIG. 4 shows an enlarged schematic view of sealing elements of a sealing stage 120. As noted, seal stages 120 are designed to leak slightly. Accordingly, a thin leaking layer 127 of fluid is typically present between the sealing elements. The sealing elements are urged apart by fluid pressure of the leaking layer and are urged together by fluid pressure on the high-pressure sides of the seal stages and by urging of the rotor assemblies 142 toward block structures 150. Flow of fluid around the sealing elements 126, 128 and between the sealing elements 126, 128 through leaking layer 127, provides cooling of the sealing elements, which tends to promote consistent and/or predictable temperatures of the sealing elements 126, 128.

Rotor assemblies 142 may be free to move axially, such that the position of rotor assemblies 142 and pressure with which they urge the sealing elements together depends on fluid pressure acting on the rotor assemblies 142.

As shown in FIG. 4, seal members 126, 128 have opposing faces 126a, 128a, high pressure faces 126b, 128b, and low pressure faces 126a, 128a. High pressure faces taper away from one another in a direction extending into staging chamber 130/132 (radially outward in the depicted embodiment).

Generally, pressure acting on opposing faces 126a, 128a and high pressure faces 126b, 128b tends to urge the seal members 126, 128 apart. Loading conditions may cause deformation of seal members 126, 128, which may alter the exterior profile of the seal members and thus, the forces acting on their faces. The balance ratios of seal stages 120 is therefore affected by fluid pressure in the vicinity of the sealing elements, as well as fluid pressure acting on rotor assemblies 142 and the pressures on the stationary components (e.g. stator 128).

During operation, the propensity of seal stages 120 to leak may be related to the balance ratio of the seal stages 120. Seals may be more likely to leak at lower balance ratios and less likely to leak at higher balance ratios.

On the other hand, the rate at which the seal members wear may also be related to balance ratio. Specifically, seals may wear faster at higher balance ratios. Rotor seal member 126 and stator seal member 128 of each seal stage 120 move relative to one another and cause wear in proportion to the balance ratio of the seal stage.

Thus, effective seal design may rely on accurate determination of balance ratio. Under-estimating a seal's balance ratio may lead to a design that is prone to leaking. Over-estimating a seal's balance ratio may lead to a design that wears prematurely. In multi-stage configurations, the sealing performance and longevity of seals at each stage may depend on the pressure drop at that stage. In embodiments, it may be desired to balance the pressure drop and balance ratio at each stage, such that sealing elements wear evenly and provide equivalent sealing performance. For example, for seals with two stages, the stages tend to wear evenly when each stage bears approximately one half of the pressure drop, and the stages have approximately equal balance ratios. Conversely, if one stage bears a greater pressure drop and has a greater balance ratio, that stage may tend to wear and fail faster than other stages, while the other stage may be more prone to leaking.

Typically, seal parameters are selected based on static analysis. That is, pressures and balance ratios are typically calculated based on an assumption of negligible dynamic pressure.

However, the inventors observed that seal stages of previous designs tended to wear unevenly and leak more than expected. That is, seal stages 120 with a single seal that were predicted to have equal balance ratios were observed to wear unevenly relative to one another. In addition, some seal stages 120 were observed to perform as if they had balance ratios lower than expected.

The inventors discovered that dynamic effects may be significant in pump 100. Specifically, static pressures may vary due to dynamic effects within the staging flow circuit. For example, the pressure exerted on steal stage 120-1 depends on the stagnation pressure of fluid at point B of FIG. 3, as well as the velocity of the fluid at point B, such as the velocity of the average fluid streamline. Likewise, the pressure exerted on seal stage 120-2 depends on the stagnation pressure at point C of FIG. 3 and the fluid velocity at point C, e.g. the velocity of the average fluid streamline. Thus, the balance ratio of each seal stage 120 may depend on the pressure drop across the seal stage, pressure losses through flow passage 134 and the static pressure acting on the sealing elements, (which in turn depends on fluid velocity). Generally, high fluid velocities on the high-pressure side of a seal stage 120 reduce the force acting on high-pressure faces 126b, 128b. In addition, velocity (and thus, pressure) at the bottom of staging chamber 130 (point A in FIG. 3) relative to velocity and pressure near seal stage 120-1 (point B in FIG. 3) may impact the balance ratio and sealing effectiveness of seal stage 120-1. Specifically, lower velocity and higher pressure between the rotor assembly and stator assembly (point B in FIG. 3) may tend to urge the rotor assembly away from the stator assembly, while lower velocity and higher pressure at the entry to staging chamber 130 (point A in FIG. 3) may tend to urge the rotor assembly towards the stator assembly.

Each of rotor seal elements 126 forms part of a rotating assembly 142. Fluid flow in chambers 130, 132 passes over rotating assemblies 142 and is accelerated. Therefore flow entering a chamber 130, 132 has lower velocity and greater static pressure than flow exiting a chamber 130, 132.

While a static analysis would balance seal stages 120-1, 120-2 based on expected losses through passages 134, 138, the depicted design compensates for both losses through passages 134, 138 and dynamic effects. For example, based on simulation of the flow regime, chambers 130, 132 and flow passages 134, 138 are designed to balance the effects of fluid acceleration at stages 120-1, 120-2. Specifically, chambers 130, 132 are shaped and the flow resistance in passages 134, 138 is such that fluid flows in a consistent direction—on average, in the direction indicated by arrow F in FIG. 3.

As fluid flows through primary staging chamber 130, it traverses a path adjacent to rotating assembly 142 and thus is accelerated by the motion of rotating assembly 142 such that average velocity increases. As the fluid accelerates, its dynamic pressure increases and its static pressure correspondingly decreases. Accordingly, static pressure is reduced between the inlet of staging chamber 130 (point A in FIG. 3) and the region proximate sealing stage 120-1 (point B in FIG. 3). Likewise, as fluid flows through secondary staging chamber 132, it is accelerated by motion of rotating assembly 142 such that velocity increases and static pressure is reduced between the outlet of staging flow passage 134 and the region proximate sealing stage 120-2 (point C in FIG. 3).

As will be apparent, the tangential velocity at any point on the surface of rotating assembly 142 depends on rotational speed, and on radius from the axis of rotation. In the depicted embodiment, rotating assemblies 142 have an outer cylindrical surface 143 at a relatively large radius. During operation, the tangential velocity of the rotating assembly at points on cylindrical surface 143 is relatively high and cylindrical surface 143 therefore causes relatively significant acceleration of the surrounding fluid. Cylindrical surface 143 may therefore be referred to as an accelerating surface.

In some embodiments, chambers 130, 132 and rotating assemblies 142 may be configured to control the velocity (and thus, the static pressure) of fluid proximate seal stages 120. In particular, fluid may be accelerated as it traverses a path adjacent to one or more acceleration surfaces 143. Accordingly, chambers 130, 132 may be configured to control the cumulative acceleration due to acceleration surfaces 143, 146. In some embodiments, fluid proximate seal stages 120-1, 120-2 may be accelerated to approximately equal velocity. In other words, fluid velocity and dynamic pressure proximate seal stages 120-1, 120-2 may be approximately equal. For example, chambers 130, 132 may have equal cross sectional area proximate seal stages 120-1, 120-2, respectively.

In some embodiments, one or more acceleration surfaces 143, 146 include surface features configured to enhance the fluid velocity. In some embodiments, the features maintain the cooling flows in and around the rotating assembly. In some embodiments, the surface features can include wedges, troughs, and/or any other suitable protrusions, indentations or other surface features. In some embodiments, the surface features can include machined slots and/or windows. In some embodiments, the acceleration surfaces 143 include windows, and the acceleration surfaces 146 include machine slots.

In some embodiments, one or more acceleration surfaces 143, 146 provide for the recirculation of fluid to control the temperature of surfaces. In some embodiments, the one or more acceleration surfaces 143, 146 can additionally or alternatively serve to generate desired velocities for the force balance.

In some embodiments, the length of flow paths through chambers 130, 132 and adjacent to rotating assemblies 142 may be the same, such that fluid resides in chambers 130, 132 for a similar length of time and is therefore accelerated to a similar velocity by rotating assemblies 142. The flow path length may depend on the shapes of chambers 130, 132 and rotating assemblies 142, and the location at which fluid flow enters each respective chamber 130, 132.

In some embodiments, the velocities to be provided by one or more of the components described herein are based on absolute velocities and/or relative velocities. Absolute velocities can be targeted to adjust pressure, and relative velocities can be targeted to adjust heat transfer.

In some scenarios, the staging flow is a parameter which can be adjusted in new designs or installations. In other scenarios, such as retrofits, the staging flow parameter can be predefined by the system in place.

Referring again to FIG. 3, primary staging chamber 130 has an inlet passage 145 through which fluid is drawn from chamber 118 into chamber 130. Inlet passage 145 extends generally radially through block structure 150. Some of fluid drawn through passage 145 flows generally in the direction indicated by arrow F toward seal stage 120-1. Some of fluid drawn through passage 145 may be drained generally in the reverse flow direction indicated by arrow R through a staging chamber throat 148, which lies in an axial plane. In some embodiments, this can be driven by an auxiliary impeller.

As shown, inlet passage 145 is located at an axial position between staging chamber throat 148 and acceleration surface 143. The acceleration experienced by fluid flowing to seal stage 120-1, may depend on the position of passage 145. For example, if passage 145 were moved in direction F, relative to the depicted position, fluid acceleration due to rotating assembly 142 may be decreased if fluid traversed a shorter path adjacent to acceleration surface 143. Conversely, if passage 145 were moved in direction R, more fluid may be drained generally in direction R, and acceleration of fluid that flows to seal stage 120-1 may be increased.

Staging flow circuit 117 is configured so that seal stages 120-1, 120-2 are approximately at their desired balance ratio during operation. That is, the flow and pressure regime within staging chambers 130, 132 causes mechanical loading of seal stages 120-1, 120-2 to their desired balance ratio. The flow and pressure regimes are in turn affected by the location of inlet passage 145. For example, the location of inlet passage 145 influences the static pressure profile within the primary staging chamber 130. High pressure proximate throat 148 urges rotating assembly 142 against block assembly 150, tending to increase balance ratio of the seal stage. Conversely, lower pressure proximate throat 148 exerts less force on rotating assembly 142. In some embodiments, by balancing dynamic pressure, along with the losses through passages 134, 138, loading of the seal elements is likewise balanced. In other words, designing for both losses and dynamic effects provides for a consistent balance ratio of seal stages 120-1, 120-2. Performance and longevity of the seal stages is likewise balanced. Accordingly, seal stages 120-1, 120-2 wear at similar rates and may be serviced or replaced at the same service interval. Conversely, uneven wear between stages 120-1, 120-2 may result in premature failure or may require replacement of a seal stage 120 at a shorter interval. In some scenarios, when one stage is replaced, both stages are replaced so uneven wear can result in a less worn seal being replaced before it has been utilized to its full potential.

FIGS. 2a-2c, 3 and 4 are cross-sectional views of seal assembly 116. For simplicity, some components of seal assembly 116 are depicted schematically in planar orientation. However, as will be apparent, such structures may extend radially, e.g. in a direction normal or skewed relative to the plane of the depicted cross section. Likewise, flow paths depicted as planar in FIGS. 2a-2c, 3 and 4 may extend around the radius of seal assembly 116. For example, chambers 130, 132 and fluid passages 147, 149 and 136 may be generally annular. Additionally or alternatively, structures shown as planar and described as singular may, for example, be series of radially-extending passages spaced at different angular orientations. For example, passage 145 may extend radially. A single passage 145 may be present, or a plurality of passages 145 may be present, spaced at even intervals around seal assembly 116.

During operation of pump 100, temperatures within seal assembly 116 may increase, causing expansion of components. The rates and direction of expansion may depend on factors such as part shape and material properties.

Differential expansion of components may cause changes in sealing geometry. Such changes could result in increased clearance or reduced pressure between sealing elements 126, 128 and thereby reduce the stability or sealing effectiveness of a seal stage 120.

Therefore, in order ensure sealing performance and to manage component wear, components of seal assembly 116 may be configured to promote or maintain dimensional stability of seal stages 120-1, 120-2 and their respective sealing elements 126, 128 throughout the typical range of temperatures that would be occur during normal operation of pump 100. In some examples, during normal operation, components of seal assembly 116 may typically be subjected to temperatures between approximately 90° F. and 200° F. Seal components may be formed of a material such as silicon carbide or titanium carbide with a relatively low coefficient of thermal expansion in the anticipated operational thermal range. As will be apparent, operating temperatures may vary depending on reactor design and material choices may likewise vary. Suitable materials are those which deliver adequate sealing and wear performance, with sufficiently low thermal expansion such that sealing performance is not excessively degraded by normal operating temperatures. For example, if sealing elements 126, 128 are designed to be self-relieving, the part geometry and materials may be designed such that the self-relieving feature is maintained throughout a normal operating temperature range.

In some embodiments, one or both of seal elements 126, 128 may be constrained by one or more expansion-control rings 160. Expansion-control rings 160 may be high-strength metallic components installed around seal elements 126 or 128. Expansion-control rings 160 may be sized with a nominal inner diameter sized to radially constrain seal elements 126, 128 around which they are installed. Expansion-control rings 160 may be formed of a material with a low coefficient of expansion at normal operating temperatures of pump 100. At such temperatures, expansion-control rings 160 mechanically resist thermal expansion of seal elements 126, 128 such that the shapes of seal elements 126, 128 are maintained. For example, in the depicted embodiment, seal elements 126, 128 taper slightly away from one another at the radially-outermost portion of their interface. Pressure acting against the tapered portions of the seal elements tends to urge the seal elements away from one another. Thus, the shape of the seal elements may serve a self-relieving function.

In some embodiments, as the temperature rises, the seal surfaces are configured to deflect such that they open more and allow more leakage. This leakage serves to cool the rubbing surfaces thereby reducing the hear going through the seal parts.

Certain operational conditions in a nuclear power generation facility may lead to a loss of coolant flow. In such events, operation of coolant pump 100 may cease. Fluid temperature in pump 100 may increase dramatically and may significantly exceed normal operational ranges. Safety and regulatory considerations may require protection against leaks in such events. In some examples, fluid temperatures up to or exceeding 500° F. may be experienced in a loss of coolant flow event such as a blackout. Expansion-control rings 160 may have a greater coefficient of thermal expansion than sealing elements 126 and rotor assemblies 142. Thus, as temperature increases, clearance between sealing elements 126 and expansion-control rings 160 may increase. Alternatively, expansion control rings 160 may be configured to have an increased coefficient of thermal expansion above a threshold temperature, in a range expected during a loss of coolant flow event and higher than normal operating temperatures. In a loss of coolant flow event, expansion-control rings 160 expand, creating clearance between sealing elements 126 and expansion-control rings 160. This in turn allows sealing elements 126, 128 to expand into one another. Expansion of sealing elements 126, 128 may be sufficient to eliminate leakage through seal stages 120. Further temperature increases may reinforce the seal by causing sealing elements 126, 128 to continue expanding together.

In some embodiments, materials for these components are selected based on their material properties. In some scenarios, selecting different materials can allow for selective disengagement of rings so that beyond a given threshold there is a change in the overall behaviour of the rotating assembly.

In the depicted embodiment, the expansion-controls rings 160 installed around a particular sealing element 126 may be formed of different materials, with different thermal expansion rates. For example, one ring 160 may be formed of nitronic 50 and another ring of stainless steel. Differential expansion rates of the expansion-control rings 160 may lead to one ring 160 disengaging from sealing element 126 before the other ring 160. This may, in turn cause the sealing element 126 to deform as it expands above the normal operating temperature. For example, sealing element 126 may deflect toward sealing element 128, such that any self-relieving properties of the seal are removed.

In other embodiments, expansion-control rings 160, illustrated as expansion-controls 160-1 and 160-2 in FIG. 4, may be formed of the same material, but may be sized for differing nominal clearance (or interference) with sealing element 126. In such designs, one expansion-control ring 160-1, 160-2 may expand out of contact with sealing element 126 before the other. Alternatively or additionally, sealing element 126 may be shaped such that its diameter varies and the nominal inner diameters of expansion-control rings 160 differ. In such configuration, an equal percentage change of the expansion-control rings 160 may correspond to a greater absolute change in diameter in the larger of the two rings. Accordingly, expansion control rings 160 may be sized for the same amount of nominal clearance or interference with sealing element 126, and may be formed of the same material, but the larger ring may release the sealing element 126 at a lower temperature than the smaller ring.

In some embodiments, geometry of sealing elements 126, 128 may be such that a single expansion-control ring may be used, or such that multiple rings may be used that are configured to release the sealing element 126 at the same temperature. Specifically, sealing elements 126, 128 may be designed and expansion constrained such that, at normal operating temperatures, sealing elements 126, 128 permit a small amount of leakage, are self-relieving under thermal expansion, or both, while at temperatures above the normal operating range, one or more expansion-control rings 160 releases and sealing element 126 is permitted to expand towards sealing element 128 and thereby reduce or eliminate leakage or self-relieving properties.

Sealing assembly 116 therefore provides a failsafe against leakage. However, because components have relatively low coefficients of expansion, the balance ratio of the seal during regular operation is not materially affected, nor is the rate of wearing or the sealing performance under normal operational conditions affected.

As described above, fluid flow enters each respective one of primary staging chamber 130 and secondary staging chamber 132 at an inlet end, while seal stages 120-1, 120-2 are positioned proximate the outlet ends of staging chamber 130', 132'. Fluid flow traverses chamber 130 or chamber 132 before reaching the respective sealing stage 120 and is accelerated during such traversal. The effects of acceleration, i.e., decreased static pressure, are balanced between stages. Moreover, the amount of acceleration, and thus, the change in static pressure at sealing stages 120 may be controlled by changing the length of the fluid flow path proximate accelerating surface 143, 146. As described herein, in some embodiments, this is also controlled by the shape of the chambers 130, 132 and by features of the surfaces 143, 146.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

What is claimed is:

1. A coolant pump comprising:
a casing assembly having a gland housing;
a seal assembly having a staging flow path defining first and second seal chambers;
a rotor assembly pumping a coolant fluid through said gland housing, the rotor assembly having at least one acceleration surface, wherein fluid passing through the staging flow path is accelerated by said at least one acceleration surface;
first and second seal stages within said first and second seal chambers, each having a stator seal member and a rotor seal member, said stator seal member and said rotor seal member configured to engage one another to form a seal at a sealing interface defined between said stator seal member and said rotor seal member;
an inlet passage for feeding the coolant fluid into said staging flow path and past said acceleration surface;
wherein said sealing members are configured to thermally expand and wherein said sealing members are configured to restrict expansion of said rotor seal member below a threshold temperature,
wherein said rotor seal member comprise a first and second expansion control ring around said rotor seal member, said first expansion control ring configured to expand out of contact with said rotor seal element at a lower temperature than said second expansion control ring.

2. The coolant pump of claim 1, wherein said at least one acceleration surface, and said first and second seal chambers, are configured to generate a desired velocity of said coolant fluid to provide a consistent balance ratio of said first and second seal stages, and wherein said balance ratio of each of said first and second seal stages is a ratio of forces closing each said seal and forces opening each said seal.

3. A method of sealing a pump, the method comprising:
directing pressurized fluid through a first section of a staging flow path towards a first seal;
increasing angular velocity of the pressurized fluid as it traverses said staging flow path by motion of a rotor assembly of said pump, wherein said increasing said angular velocity comprises directing said pressurized fluid over at least one accelerating surface of said rotor assembly;
directing the pressurized fluid through a second section of said staging flow path towards a second seal, wherein each of the first and second seal have a stator seal member and a rotor seal member, said rotor seal member comprise a first and second expansion control ring around said rotor seal member, said first expansion control ring configured to expand out of contact with said rotor seal member at a lower temperature than said second expansion control ring,
restricting thermal expansion of at least one of said first and second seal below a threshold temperature;
tightening at least one of said first and second seal in response to elevated fluid temperature above said threshold temperature.

4. The method of claim 3, comprising increasing said angular velocity in said second section of said staging flow path by directing said pressurized fluid over said at least one accelerating surface of said rotor assembly.

5. The method of claim 3, comprising directing said pressurized fluid into said staging flow path through a radially-extending inlet passage.

6. The method of claim 3, wherein said at least one acceleration surface, and said first and second sections of said staging flow path, are configured to generate a desired velocity of the coolant fluid to provide a consistent balance ratio of said first and second seal stages, and wherein the balance ratio of each of said first and second seals is a ratio of forces closing each said first and second seal and forces opening each said first and second seal.

7. A seal assembly for a pump, comprising:
a gland housing for mounting to a pump casing;
a staging flow path within the gland housing defining first and second seal chambers;
a rotor assembly pumping a coolant fluid through said gland housing, the rotor assembly having at least one acceleration surface, wherein fluid passing through the staging flow path is accelerated by said at least one acceleration surface; and first and second seal stages within said first and second seal chambers, each having a stator seal member and a rotor seal member, said stator seal member and rotor seal member are configured to engage one another to form a seal at a sealing interface defined between said stator seal member and said rotor seal member;

an inlet passage for feeding the coolant fluid into said staging flow path and past said at least one acceleration surface, wherein said sealing members are configured to thermally expand and wherein said sealing members are configured to restrict expansion of said rotor seal member below a threshold temperature, wherein said rotor seal member comprise a first and second expansion control ring around said rotor seal member, said first expansion control ring configured to expand out of contact with said rotor seal member at a lower temperature than said second expansion control ring.

8. The seal assembly of claim 7, wherein said first and second seal chambers define respective flow paths adjacent to components of said rotor assembly, and wherein said flow paths have a same length.

9. The seal assembly of claim 8, comprising a rotor assembly positioned in each of said first and second seal chambers respectively, each said rotor assembly having at least one acceleration surface.

10. The seal assembly of claim 9 wherein each said rotor assembly has a plurality of acceleration surfaces with a plurality of surface features for accelerating fluid velocity.

11. The seal assembly of claim 7, wherein said inlet passage extends radially.

12. The seal assembly of claim 7, wherein said staging flow path extends axially parallel to a shaft of said pump.

13. The seal assembly of claim 7, wherein a pressure drop across said first seal stage and a pressure drop across said second seal stage are equal.

14. The seal assembly of claim 7, wherein said rotor seal member comprises an expansion control ring, and wherein the expansion control ring is configured to tighten said rotor seal member in response to elevated fluid temperature.

15. The seal assembly of claim 7, wherein the threshold temperature is above an operating temperature range.

16. The seal assembly of claim 7, wherein the staging flow path within the gland housing defines a third seal chamber, the seal assembly comprising a third seal stage within said third seal chamber, the third seal stage having a stator seal member and a rotor seal member.

17. The seal assembly of claim 7 wherein said first and second seal chambers have respective geometries to control fluid velocity or dynamic pressure proximate their respective said seal stages, wherein said geometries include at least one of the geometries of the at least one acceleration surface, the stator seal member, the rotor seal member, the inlet passage, and the staging flow path.

18. The coolant pump of claim 7, wherein said at least one acceleration surface, and said first and second seal chambers, are configured to generate a desired velocity of said coolant fluid to provide a consistent balance ratio of said first and second seal stages, and wherein said balance ratio of each of said first and second seal stages is a ratio of forces closing each said seal and forces opening each said seal.

\* \* \* \* \*